RECORDING OR REPRODUCING APPARATUS WITH A PLURALITY OF TAPE CARTRIDGES MOUNTED ON A TURRET

Original Filed June 15, 1959 5 Sheets-Sheet 1

*INVENTOR*
ROBERT E. KLEVE

INVENTOR
ROBERT E. KLEVE

INVENTOR
ROBERT E. KLEVE

INVENTOR
ROBERT E. KLEVE

INVENTOR
ROBERT E. KLEVE 3,524,949

RECORDING OR REPRODUCING APPARATUS WITH A PLURALITY OF TAPE CARTRIDGES MOUNTED ON A TURRET

Robert E. Kleve, 1103 24th Ave. S., Grand Forks, N. Dak. 58201

Continuation of application Ser. No. 307,747, Sept. 9, 1963, which is a continuation of application Ser. No. 820,141, June 15, 1959. This application Apr. 17, 1967, Ser. No. 651,076
Int. Cl. G03b *1/56;* G11b *15/66;* G65h *17/48*
U.S. Cl. 179—100.2 26 Claims

ABSTRACT OF THE DISCLOSURE

The invention comprises a multiple tape apparatus which has a take-up reel, transfer means and a plurality of supply reels, with the transfer means transferring the tape from one of the supply reels to the take-up reel. Cam means are provided and rewind means are provided with the cam means actuating the transfer means, take-up reel, and rewind means.

The present invention relates to recording or reproducing equipment and more particularly to sound or light equipment where a large number of recordings may be selectively and automatically recorded or reproduced. This application is a continuation of my co-pending application, Ser. No. 307,747, filed Sept. 9, 1963, now abandoned, and my application, Ser. No. 307,747 is a continuation of my then co-pending application, Ser. No. 820,141, filed June 15, 1959, now abandoned. This invention is also related to the subject matter of my application, Ser. No. 413,984, filed Mar. 4, 1954, which also was co-pending with Ser. No. 307,747 and Ser. No. 413,984 is now Pat. No. 2,964,593.

Heretofore several types of automatic selection equipment for sound or light recording and reproducing have been devised which are capable of playing a plurality of individual units of magnetic tape or similar recordable strip material. However, none of these has been entirely satisfactory from the standpoint, for example, of providing a device for selectively recording or reproducing upon a plurality of records, reels, or tapes which may be simply and economically produced and which retains the automatic selection advantage of the expensive and heavy selection system equipment. Many of these devices, for example, have complicated and elaborate mechanical electrical systems dependent upon numerous electrical elements such as relays, solenoids, etc., and motors in order to operate the machine.

An object of the present invention is to overcome the difficulties of the prior multiple recording and reproducing machines and to provide a novel magnetic recording or reproducing multiple selection device sufficiently inexpensive to be salable as a common household item.

Another object of the present invention is to provide a novel rotating turret selection system and sequence mechanism for selecting, positioning and recording or reproducing and adaptable for use with different recording or reproducing mediums including disc-like mediums, reeling and unreeling mediums, etc.

Another object of the present invention is to provide a novel structure for selectively recording or reproducing upon a plurality of strands, tapes or films.

Another object of the invention is to provide an improved form for selectively attaching a strand of material from a plurality of supply reels or cartridges to a single take-up means and an improved form of removing the material.

Another object of the invention is to provide a novel rotating turret having individual units of recordable or reproducible material thereon with selector means upon the turret adjacent each of the units, and a novel means for scanning and selecting, and actuating the automatic rotating and positioning of the turret for recording or reproducing upon a selected unit.

Another object of the invention is to provide a novel, rotating turret, scanning and selection arrangement and mechanism for magnetic recording or reproducing.

Another object of the present invention is to provide a novel, rotating turret selection system and sequence mechanism for selecting, positioning and recording or reproducing selectively a plurality of individual units of recordable or reproducible material thereon, a novel means to rotate the turret for scanning indicia upon the units and selecting certain units for automatic recording or reproduction, and for interchanging and replacing the individual units.

Another object of the present invention is to provide a novel electrical and mechanical device for a recording or reproducing mechanism.

Another object of the invention is to provide an automatic multiple recording or reproducing system utilizing an improved electrical system to coordinate and actuate a cam mechanism.

Another object of the invention is to provide a multiple recording or reproducing machine which is adaptable for stereophonic, binaural, light-wave frequency, or high fidelity recording or reproducing.

Other and further objects and advantages of the invention will be apparent as the description proceeds and upon reference to the accompanying drawings wherein.

Briefly stated the present invention provides an automatic rotary, multiple selection sound recording or reproducing apparatus having a revolving turret with a plurality of individual containers of magnetic tape inserted in wells within the turret at spaced intervals thereabout. A selector button mounted adjacent each well for actuating the recording or reproducing upon the container within the particular well, whereby any number of the plurality of containers of tape may be selected by depressing their respective adjacent buttons and the selected containers will be automatically recorded or reproduced in counterclockwise succession by the automatic rotation of the turret to bring the selected containers into successive alignment with the recording or reproducing mechanism.

The invention further provides a means for rotating the turret manually for scanning whereby all of the containers and the respective selector buttons may pass about in front of the machine and the operator may readily select all of the containers desired from this one location, without having to reach around toward the rear portion of the machine.

The invention provides the following sequential arrangement. Of the plurality of magnetic tape containers placed in the turret, the particular containers selected are brought into position in clockwise rotation for recording or reproducing by the automatic rotating of the turret. The selected container first in line from a counterclockwise direction moves into position with a take-up reel and magnetic head, and the selector button mounted between each container automatically causes the turret to terminate its rotation. The mechanism beneath the turret automatically performs the attachment of the end of the tape of the selected cartridge to the take-up reel, places a portion of the tape into operative engagement with the magnetic head and automatically drives the tape past the magnetic heads at a constant rate of speed for the recording or reproducing. After a predetermined period, the mechanism automatically terminates the recording or reproducing and returns the tape into the container, automatically releases the end of the tape on the take-up reel whereby it may return, assisted, to the container, and automatically rejects the selector button. The turret thereupon automatically resumes rotation to bring the next selected container into position for recording or reproducing. This operation continues to repeat until all the selected containers have been recorded or reproduced thereupon.

Figures 1, 2, 3, 5:
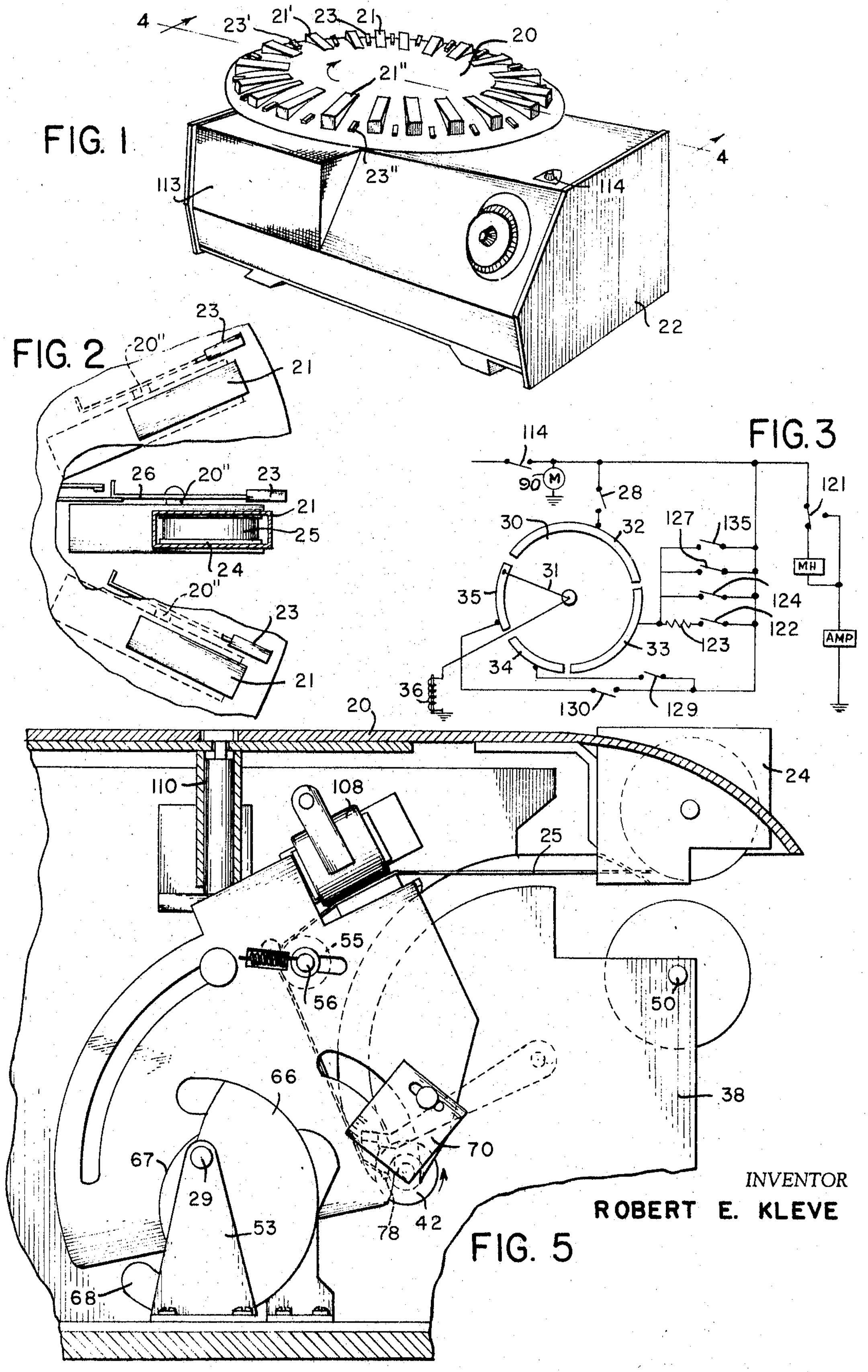
FIG. 1 is an outside perspective of the machine disclosing the turret or circular holder for the containers, selection buttons, and the case or cabinet.
FIG. 2 is a fragmentary view of the turret and selector buttons with a cutaway showing the mounting plates and interior of the tape containers.
FIG. 3 is a schematic circuit diagram.
FIG. 5 is a front view of the mechanism and cutaway of the turret disclosing the mechanism in its recording or reproducing position.

Referring more particularly to the drawings, FIG. 1 is an outside view of the rotating turret 20 holding the magnetic tape containers 21. The turret is mounted upon cabinet or case 22. The turret or circular container holder 20 moves in a clockwise direction as the selector keys 23 mounted thereon and their respective adjacent containers come into alignment with the internal recording and reproducing mechanism and the selector key when aligned and if depressed actuates the mechanism and the turret temporarily stops for recording upon the selected adjacent container.

Inside of each tape container 21 is a tape reel 24, and a wound body of tape 25. The tapes may have tunes or selections pre-recorded thereon or they may be left blank. Each of the tape containers may be individually removed by moving them upwardly out of the wells 20' of the turret 20. The names of the recorded selections may be placed upon the upper face of the tape container 21. Selections may thus be made while the turret is standing still as the names of all the recordings are clearly exposed from the top. The selections may also be made by rotating the turret by hand, revolving the tape containers past in front of the operator enabling the operator to make the selections by merely depressing the respective selector button adjacent the container.

When selecting the tunes by rotating the turret by hand it is preferable to do so when the machine is turned off. Through the drive to the turret is a friction drive which is readily overcome whether the turret is being driven or not and accordingly will slip when pressure is exerted by the hand of the operator.

Figure 11:
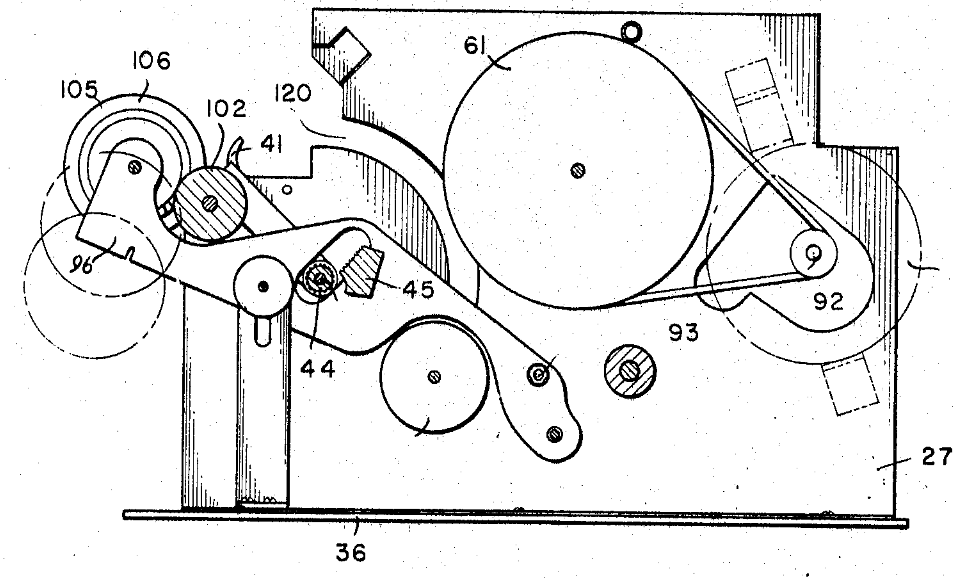
FIG. 11 is a back view cutaway of the interior mechanism along line 11—11 of FIG. 6.

The rotation by hand for scanning and selecting preferably is in the opposite direction to the direction of the automatic turret drive, as the forward portion 26 of a selector button when depressed positively stops the turret by abutting plate 27, during its automatic clockwise turret drive, placing the adjacent tape container in line for recording or reproducing as viewed from FIG. 11. The abutting portions 28, however, of the plate 27 is made to pivot in the opposite direction as in FIG. 1, thus the turret may be rotated by hand counterclockwise a complete revolution and more even though selector buttons are depressed, as the pivoted portion 28' will allow the forward end 26 of the depressed selector buttons to pass through when rotated counterclockwise.

In automatic operation, the microswitch 28 holds the pivoted portion slightly away from the plate 27 in the direction toward the end portion 26 of the oncoming selector buttons. As the turret and buttons move clockwise under power the end of the depressed selector button will push the pivoted portion in line with the plate 27, which will actuate microswitch 28' which in turn acts to disengage the turret drive, and initiates the recording or reproducing sequence in a manner to be more fully explained later.

The interior mechanism is constructed in a manner to operate in four distinct sequences, the turret positioning or hunting sequence, the recording or reproducing sequence, and rewinding sequences. The four sequences take place each time for recording or reproducing each selected tape container and are accomplished in one complete revolution of the main cam shaft 29. These sequences, however, may vary in number depending upon the type of recording or reproducing medium used. This arrangement in cooperation with the electrical circuit system for the invention as illustrated in FIG. 3 provides a positive sequencing of the automatic operation of the machine. The circular disc 30 of the electrical system is mounted with its center through the cam shaft 29, but does not rotate with the cam shaft, the rotary contact arm 31, however, does rotate with the cam shaft, and acts to positively control and coordinate the sequences by activating certain switches and deactivating others depending upon the sequence machine happens to be in. The circular disc 30 has four segmented arc contacts (32, 33, 34, 35) each of which governs one sequence, and is proportional in arcuate length to the proportionate part of the cam shaft movement used to place the mechanism in that particular sequence. The automatic change of sequence is effected through the single solenoid 36 which activates and engages the drive to the cam shaft, acquiring its current through the corresponding arc contact, and deactivating when it has passed across the full length of the particular arcuate contact thereby disengaging the drive to the cam shaft and placing the machine in the next sequence. This arrangement among other things minimizes the number of electrical elements which would be necessary to prevent such things as power failure, etc., from throwing the sequences completely out of phase. The single cam shaft system in controlling and causing substantially all movements of machine mechanism in a single revolution tends to reduce the electrical components such as relays and solenoids which otherwise might be necessary to accomplish the sequential positioning of the mechanism when some movements are controlled independently of others.

Figure 4:
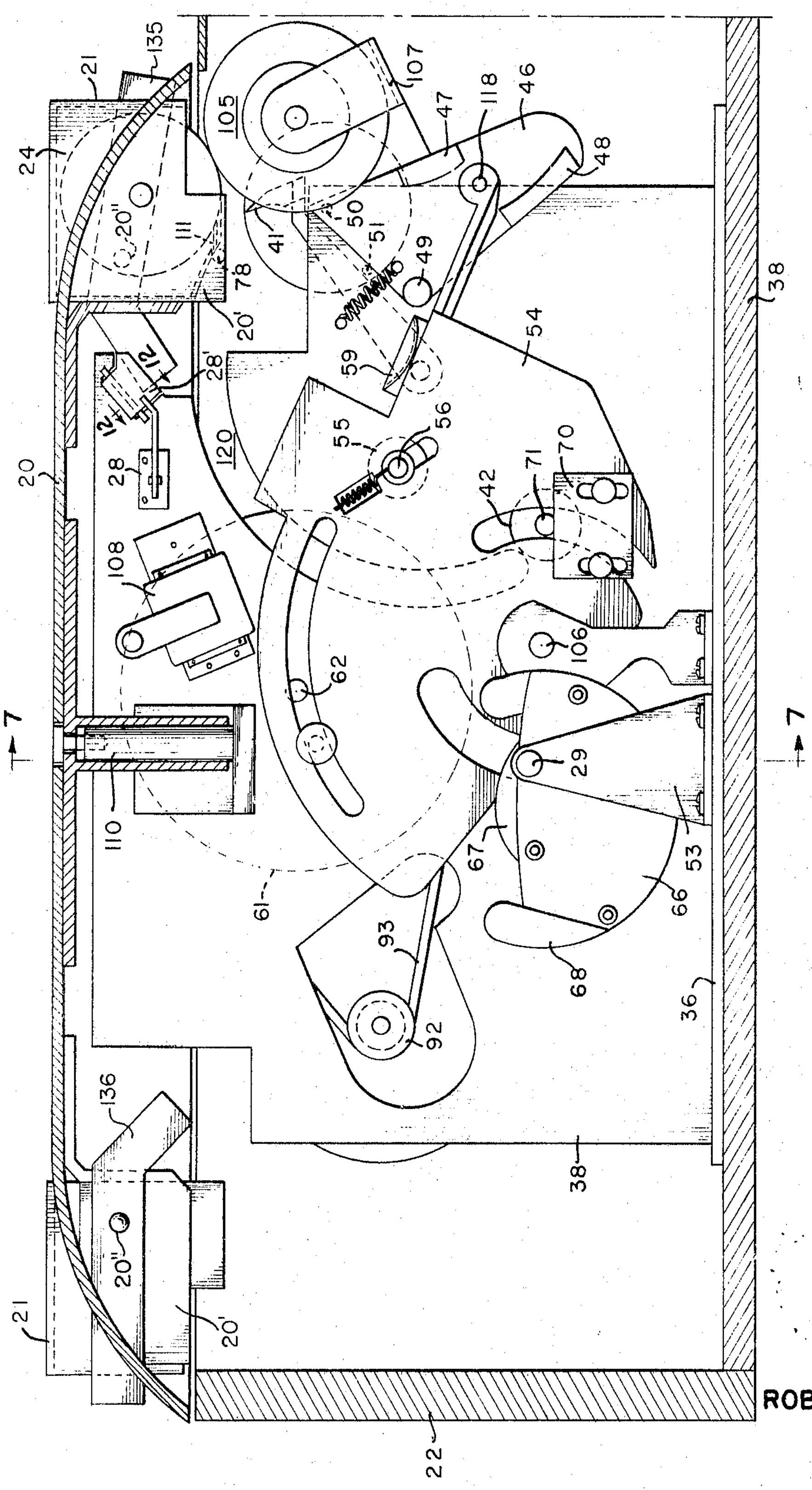
FIG. 4 is a sectional view of the turret and container case along line 4—4 of FIG. 1, with a front view of the interior mechanism mounted therein.
Figure 12:
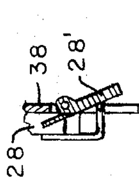
FIG. 12 is a cutaway along line 12—12 of FIG. 4, of the one way pivot for scanning.

Referring specifically to the drawings, FIG. 4 discloses the front view of the interior mechanism and a cutaway of the rotating turret. The interior mechanism includes a base 37, mounted to the base 38 of the cabinet 22 and mounted upon base 37 are fixed upright frames 27, 39 and 40. A take-up claw 41 is mounted between uprights 27 and 39 for transferring the end of the tape of a container onto the take-up reel 42 to draw the tape out of the container for recording or reproducing. Take-up claw 41 is mounted fixedly to shaft 43. Shaft 43 is mounted to frame 27 and frame 39 at either end and a spur gear 44 is fixedly mounted to shaft 43 for engagement with sectional gear 45 whereby the movement of sectional gear 45 in turn rotates shaft 43 and claw 41 in either direction. Cam 46 has two segmental contacting surfaces 47 and 48 and is pivotally mounted to plate 27 by means of a shaft and end retaining member 49. Cam 46 is spring urged against the end of shaft 50 and toward a limiting stop 51 and said inclined surface portion 52 acts to engage the end of shaft 50 for movement of said shaft and attached elements in a direction along the center line of the shaft. End support 53 has a shaft 29 mounted thereon. The shaft 29 is fixedly mounted to a plate 54 and said shaft is pivotally supported on frame 27. Plate 54 has a pressure roller 55 mounted on shaft 56, said roller being slidably mounted in a direction transverse to its axis within plate 54 and is positioned by means of a washer 57 on one side of plate 54 and locking nuts 58. Mu metal closure 59 is mounted on plate 54 for holding the tape against the magnetic head during the playback or recording period, the cap having a felt member 60 mounted resiliently therewithin for providing the pressure to firmly maintain the tape contact with the head. The cap or closure also provides shielding against stray magnetic fields. The fly wheel 61 is mounted within its center axis parallel to the base member 36 and is rotatably mounted at each end by frame 27 and frame 39. Capstan 62 of the fly wheel 61 is integral with the fly wheel while the shaft portion on the opposite side may be made separable. Attached on the opposite end of the capstan shaft is a friction gear member 63 having a rubber friction surface for engagement with the end of spring loaded gear member 64. Clutch 65 section has radially extending teeth 66 at one end for mating engagement with spring loaded clutch gear 67 having opposing radial teeth. Gear member 67 is slidably keyed on shaft 29 so as to rotate with the turning of the shaft but to move relative to the shaft in the direction parallel of the shaft's center axis and toward and away from the engaging teeth of gear clutch member 65. Cam 66 has an inner contacting surface 67 and an outer contacting surface 68 for engaging and guiding roller member 69. Roller member 69 is pivotally mounted to plate 54 whereby the movement of cam 66 acts to position the relative movement of plate 54 and the movement of plate 54 in turn acts to position the member 46. Cam member 70 is fixedly mounted to plate 54 for engagement with shaft 71.

Shaft 71 is supported on an extended bearing within frame member 38. Shaft 71 is slidably mounted within its bearing member as well as rotatably mounted. A split take-up reel structure 42 is mounted upon shaft 71. The slpit take-up reel comprises two separable members, a rear member consisting of a flange 72 formed integral with half hub 73 and a front member consisting of flange 74 which is formed integral with half hub member 75. The rear member (72, 73) is rotatably mounted upon shaft 71 and this rear member is restrained against frame 38 by a spring 76 mounted between the two half hubs preventing the rear member from movement along a path parallel to its center axis. Front member (74, 75) is rigidly mounted for rotation with shaft 71 and for movement with shaft 71 along their common center axes.

Hubs 73 and 75 have annular channel portions 77 within their respective hub portions. The inner peripheral edges of hub portions and the annular channel portions are tapered to provide a slightly dull but knife-like grasping of the bead 78 of the tape when placed within the annular channel between the half hubs. The movement of shaft 71 along its center axis rearwardly acts to move the front hub member (74, 75) toward rear hub member (72, 73). The movement of the front member is caused by the employment of cam 70 against the end of shaft 71.

A flat rigid strip member 79 is mounted within the hub 75 in its annular channel portion for engaging the bead when placed within the hub and acts to draw or carry the bead rotatably with the front hub member thereby causing the tape to be wound upon the split hubs within their respective flanges, the power for rotating the front half hub to thereby wind tape upon the half hubs is provided by the engagement of felt member 80 and 81 which are mounted upon disks 82 and 83, respectively, and which engagement is caused by the cam engagement of the end of shaft 71 and moving the shaft along its center axis.

The power for rotation being transmitted through pulley 84 along shaft 85 to friction surface 81 acts to rotate friction surface 80 and disk 82 when the two friction surfaces are engaged. Disk 82 being rigidly mounted to shaft 71 thereby causes the rotation of the shaft.

Figure 10:
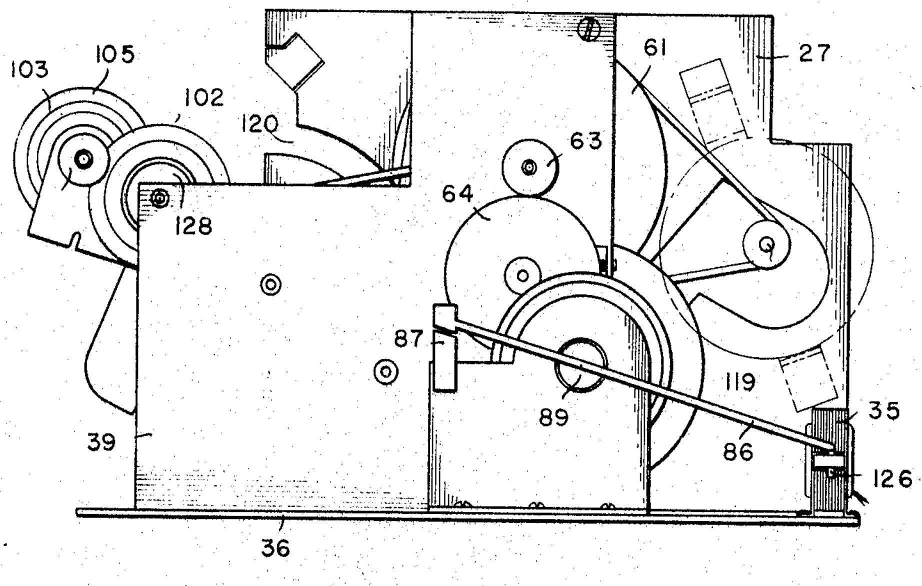
FIG. 10 is a back view of the interior mechanism.

At the rear of the machine when viewed from FIG. 10, solenoid rod 86 is pivotally connected to post 87, post 87 having a shaft on the upper end and mounting said rod at one of its extremities. At the other end of said rod 86 is a pin fixedly mounted to the rod which engages in a slot at one end of the solenoid a plunger 88. The activation of the solenoid 36 causes the solenoid plunger 88 to move inwardly which in turn moves bar 86 into engagement against cap 89. Cap 89 thereupon moves clutch 67 into engagement with clutch member 65 thereby causing the rotation of the cam shaft in a counterclockwise direction as appearing in FIG. 2. The motor 90 is shown fixedly mounted to frame 27, however, in actual practice, a cushioning member would be inserted therebetween in order to minimize the amount of vibration transmitted to the frame resulting from the operation of the motor. The motor shaft 91 drives pulley gear 92, said pulley in turn driving a rubber friction belt or O-ring 93 and the belt 93 engaging around the peripheral edge of the flywheel 61 to rotate the same.

Figure 8:
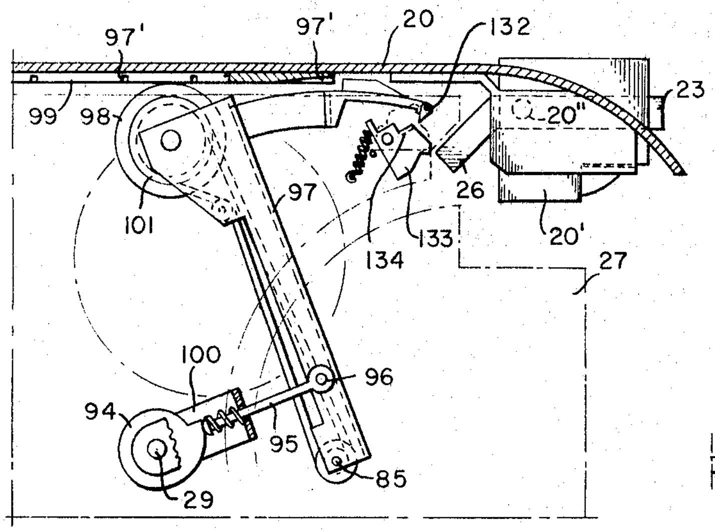
FIG. 8 is a view of the turret drive mechanism and the related operational mechanism for the selector buttons.

The drive to the turret or circular container as illustrated in FIG. 8 includes cam 94, which is fixedly mounted onto shaft 29, engages rod 95 at pivot point 96 which in turn moves frame member 97 pivotally upwardly, carrying along with it friction drive member 98. The upward movement of frame 97 thereby causes friction gear drive member 98 to engage the inner surface 99 of turret or container holder 20. Rod 95 is pivotally mounted and slidable radially to cam shaft 29 through its mounting on frame 100. Frame 97 is pivotally mounted to shaft 85, having a pulley thereon, and a belt 101 engaging the lower pulley and the upper pulley, the upper pulley being fixedly mounted to friction gear 83 along the same axis.

Figure 6:
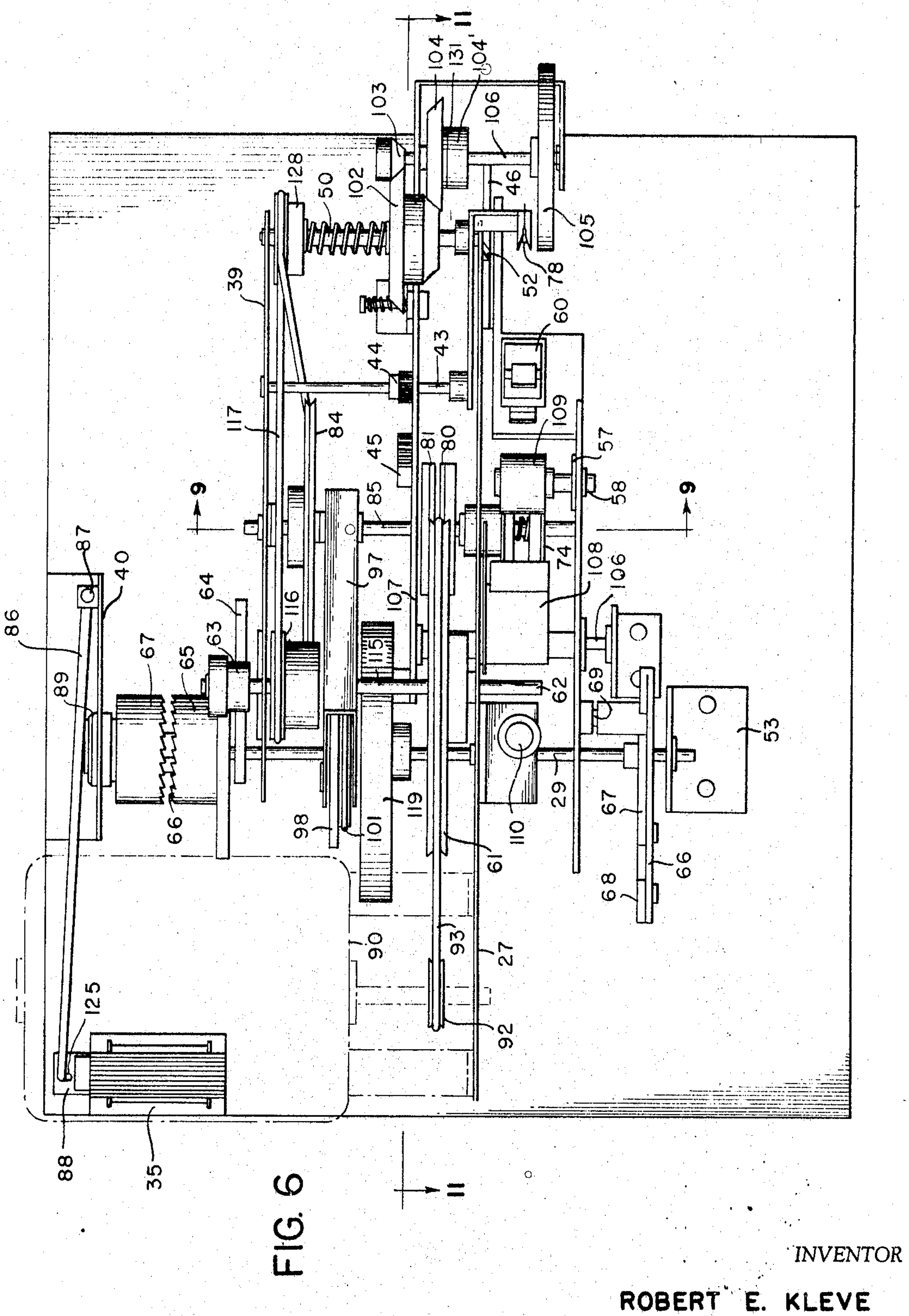
FIG. 6 is a top view of the interior mechanism.
Figure 7:
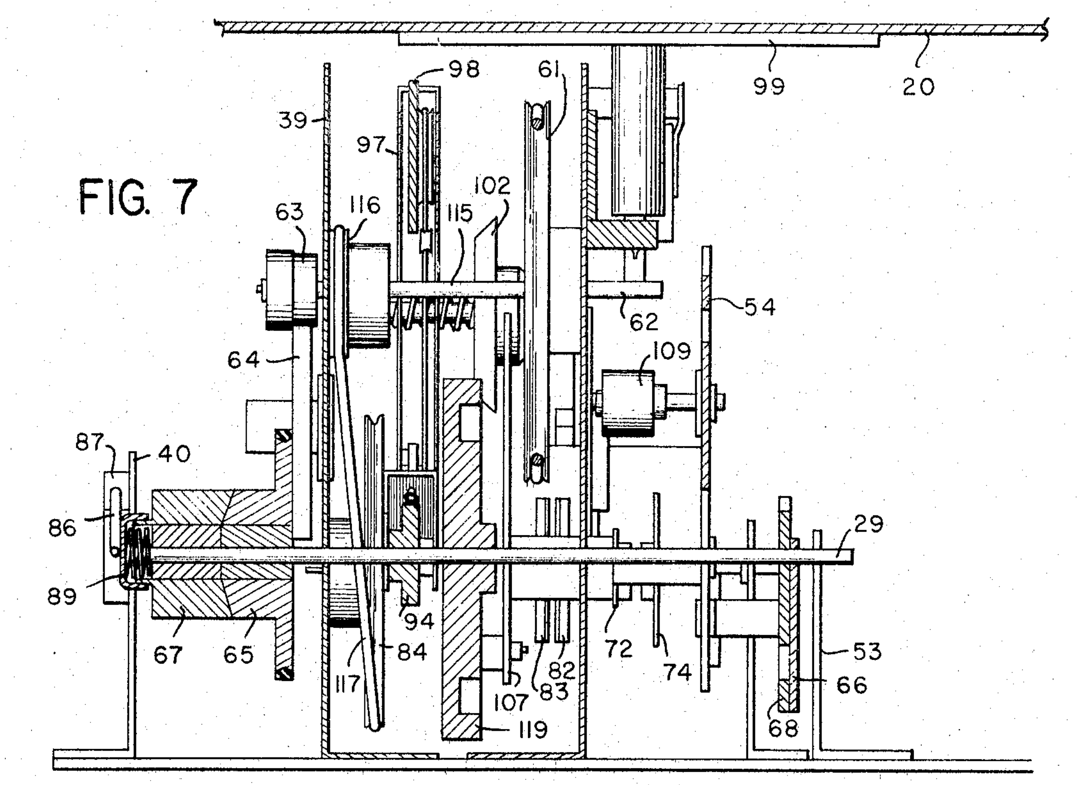
FIG. 7 is a cutaway of the interior mechanism and turret along line 7—7 of FIG. 4.
Figure 9:
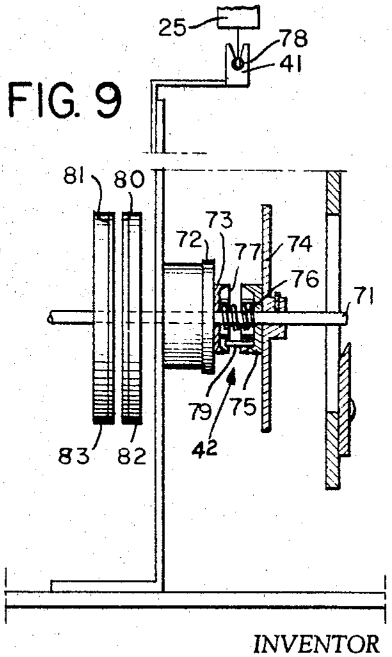
FIG. 9 is a cutaway of a portion of the tape pick-up reel drive mechanism along line 9—9 of FIG. 6.

At the right side of the machine best illustrated in FIG. 6 is the two-speed rewind mechanism. Cam 46 engages shaft 50 thereby moving the shaft and gear member 102 into engagement with gear member 103 through its angular surface. Gear member 102, when not having been shifted by the action of the cam 46, is normally engaged with gear member 104 along their angular surfaces. When gear member 102 is engaged with gear 103 it acts to drive gear member 105 at a higher rate of speed, however, when gear 102 is engaged with gear 104 it acts to drive friction gear member 105 at a very low rate of speed. Gear member 105 is pivotally mounted to shaft 106 for movement upwardly and downwardly. When gear member 105 is at its extreme upward position it engages the edge of the flange 24 of the supply reel of the container to cause the rewinding at either a high rate of speed or a low rate of speed, depending upon the position of gear member 102. Gear member 105 is mounted to frame 107 for its pivotal movement about shaft 106. Magnetic head 108 is mounted adjacent the path of the tape travel when the pressure roller 109 has engaged capstan 62 for driving the magnetic tape on the take-up reel 42.

Mounted on the turret or container holder 20 adjacent each container 21 is a selector button 23 for engaging microswitch contact member 28. Magnetic head 108 is adjustably mounted onto plate 27. The turret or container holder 20 is pivotally mounted to shaft 110, shaft 110 being rigidly mounted to the main frame 38 and the plurality of containers 21 rest in wells within the turret 20. The container is so constructed that one side of the cartridge will be exposed to view while in the machine. Consequently, the name of the selections can be placed upon that side of the container and read for selection without the necessity of removing the containers from the holder. The supply containers 21, themselves, are individually removable at any time except when in the aligned position for recording or reproducing. The cut-away portion in the case provides access for the rewind function gear 105 to enter and engage the flange 24. A light spring (not shown) may be mounted for a slight drag upon the supply reel, to prevent the tape from unwinding when a container is being handled separate from the machine. This will also provide a drag for the playing out of the tape. The bead rests a slightly nested accessably aligned position for the claw 41, as shown, when the container 21 has been inserted into the machine and said container moved into operative position for use.

The plurality of supply reels 24 are enclosed in the tape containers 21, and containers 21 are individually inserted into the turret or container holder 20 downwardly into the position shown for example in FIG. 4. At the end of each reel of tape is mounted a bead 78 which acts as an engaging surface for the edge of the claw member 41 to grasp. At the bottom of containers 21 is a channel or slot having ridges 111 for guiding the tape in its movement out of the containers 21 for preventing the bead 78 at the end of the tape from entering within the container. Upon engagement of the claw 41 to bead 78, claw member 41 moves forward drawing the tape with it and bringing the tape down to take-up reel 42. The claw 41 moves bead 78 into the position shown in FIG. 5 whereupon cam member 70 engages shaft 71, closing the hubs 73 and 75 together and grasping bead 78 therebetween. Bead 78 is connected to a nylon thread 112 and nylon thread 112 is attached along the face of tape 113 for approximately 1½ convolutions of the tape as estimated when wound upon the reel 24. Selector buttons 23 are spring retained (not shown) in either position (not shown), either in its depressed or extended, non-selected position.

Referring again to the exterior of the machine as shown in FIG. 1, the speaker is mounted immediately within grill member 113. A three-way selector switch may be mounted to the inclining wall of the case 22 as it is contemplated to have a radio, record, and play back combination use of the machine. A conventional radio circuit means (not shown) may be used in conjunction with the invention so that one can record from the radio onto the tape under permissive conditions as well as record from the external jack and can play back the recorded selections once they have been placed on the magnetic tapes. A volume and turn-off switch 114 is mounted on the top of the case.

The operation of the invention is substantially as follows:

The operator may select any or all of the cartridges or containers resting within the rurret or container ring 20. Adjacent each container is a selector button for initiating the recording upon the tape channel or channels in that particular container. A single or dual channel head may be used depending upon whether monaural or binaural recording or reproducing is desired.

Assuming for purposes of illustration, the operator wishes to select recordings on containers 21, 21′ and 21″. By rotating the turret by hand counter-clockwise, scanning and depressing selector button 23, he selects a container 21, depressing selector button 23′, he selects container 21′ and depressing selector button 23″, he selects container 21″. The operator may then close main switch 114 which energizes the motor 90 and begins the operation of the machine automatically causing the turret to rotate or drive counterclockwise as viewed in FIG. 1.

It, incidentally, must be assumed that the machine, when the main switch 114 was last opened, had been in its hunting sequence searching for another unplayed selection, consequently upon activation of the main switch merely resumes this sequence, rotating the turret.

HUNTING SEQUENCE

The rotating of the turret or container ring results from the energizing of motor 90, the motor 90 in turn driving flywheel 61 and capstan 62 through pulley 93. Mounted on the opposite end of capstan 62 is a shaft 115 and the rotating of capstan 62 causes the shaft, gear member 63 and pulley 116 mounted thereon to rotate. The rotation of pulley 116 drives the ring belt 117, and in turn rotates pulley drive 84. The rotational movement of pulley drive 84 causes pulley belt 101 to rotate, which rotates the upper friction drive 98. Friction drive 98, being in raised engaged position with the inner surfaces 99 of turret or container ring 20, rotates the turret.

The turret or container ring rotates until selector button 23 (it being the first of the selected container buttons in counterclockwise succession) makes contact with circuit contacts 28 by pressing against plate 28′, which activates solenoid 35 (the rotary contact arm 31 being currently in contact with segmental contact 32). The activation of the solenoid draws in bar member 86. The movement of bar 86 against cap 89 acts to move clutch 67 into engagement with clutch member 65. Clutch member 65 is constantly driven by the motor 90. The power being supplied from the rotation of shaft 115 through gear member 63, then through rubber friction surface of gear 64, and then the smaller hub of gear 64 to the rubber flange of 65. This clutch surface rotates free of shaft 29 in its non-engaged position as shown in FIG. 6. Since clutch 67 is slidably keyed to shaft 29, the engagement of clutch 67 to clutch 65 causes cam shaft 29 to rotate clockwise as viewed from FIG. 4. The movement of shaft 29 counterclockwise allows rod 95 to slide downwardly thereupon disengaging drive member 98, mounted on plate 97, from the inner surface 99 of the turret or container ring, which disengages the drive to the turret or ring.

Upper portion of plate 178 may be extended to cause it to engage grooves along the inner surface of the turret to cause the turret to be accurately aligned with respect to the interior mechanism upon the removal of the turret drive by plate 97. This aligning plate merely moves into the respective offset radial groove 97′ located in the inner surface 99 of container ring 20.

Though the turret has stopped, cam shaft 29 will continue to rotate as the clutch 67 remains engaged with clutch 65 and the engagement of cam 66 along its inner surface against roller 69 causes plate 54 to move counterclockwise as viewed from FIG. 4. The movement of plate 54 counterclockwise releases the pressure of the pin 118 of plate 54 on segmental cam portion of cam 46 and allows it to spring upwardly and against shaft 50. As plate 54 continues to move upwardly pin 118 engages the lower surfaces of segmental member 47 of cam 46 and causes cam 46 to move further upwardly and its portion 52 engages shaft 50 moving it rearwardly so as to place gear member 102 in a high speed gear position for the rewinding which takes place in a later sequence.

While cam 66 is moving plate 54 upwardly cam 119 is moving plate 107 from its neutral position downwardly causing the claw 41 to bring the tape into operative position. The movement of plate 107 downwardly causes sectional rack gear member 45 to engage pinion gear 44 which drives claw 41 clockwise as viewed from FIG. 11 and downwardly. Plate 96 will move downwardly to its lowest position shown dashed in FIG. 11.

As claw 20 moves from its upper position downwardly it engages bead 78 of selected cartridge container 21 and draws end of the tape over the top of mu metal cap 59, and over the top of pressure roller 109 of plate 54 before plate 54 has moved sufficiently upwardly that the caps and pressure roller obstruct or have crossed segmental arc passageway 120. Claw 41 continues to draw the bead downwardly and moves it in between segmental hub surfaces 73 and 75. Upon the insertion of the bead in between the segmental surfaces the cap 66, in its continuing movement, now moves plate 54 further upwardly so that the small cam 70 mounted on plate 54 engages the end of shaft 71 and moving shaft 71 and hub 75 rearwardly so that hub surfaces 75 and 73 now grasp the bead within their annular channels 77. The movement of shaft 71 rearwardly also engages felt friction clutches 80 and 81 together and causes segmental hub surfaces 75 to rotate counterclockwise as shown in FIG. 8, as friction clutch surface 81 continuously rotates throughout all the sequences. The movement of hub surface 75 counterclockwise causes pin 79 to engage the bead 78 and draw the bead about in a counterclockwise direction along with the pin. This movement of the bead in a counterclockwise direction about the hub surface as viewed from FIG. 5 causes the tape to be wound upon the take-up reel.

While claw 41 is in its downward position, as shown in FIG. 5, plate 54 continues to move upwardly or counterclockwise with its spring-urged pressure roller 109 slidably mounted thereon, and crosses the arcuate path of the claw and drawing the tape upwardly and toward the left as shown in FIG. 5 until plate 54 has moved sufficiently upwardly so that the pressure roller engages capstan 62 with sufficient pressure to drive the tape between the capstan and the pressure roller at a constant speed. Simultaneously with the engagement of the pressure roller to the capstan is the engagement of the felt of the mu metal caps with the magnetic heads and the tape resting therebetween.

The cams continue to move leaving plate 54 stationary while the contour now causes plate 107 to reverse movement and to return upwardly to its neutral position. This movement in turn returns the claw 41 upwardly, clearing behind the pressure roller in contrast to its downward movement in front of the pressure roller and also clearing behind mu metal cap 59 in contrast to its downward movement where it cleared in front of mu metal cap 59. The plate 54 having arrived at its extreme upward position and plate 107 having returned to its neutral position with claw 41, returned upwardly, the mechanism and tape are now in position for the constant speed drive recording and reproducing as illustrated in FIG. 5, and the tape now is driving past the magnetic heads and onto the felt clutched take-up reel. FIG. 5 shows recording or reproducing position except, however, for claw 41 having returned upwardly.

In the electrical circuit, the contact arm in the meantime moving clockwise at this point has reached the edge of arcuate rotary contact portion 31 which was maintaining the activation of the solenoid and thus deactivated the solenoid. The length of the segmental arc 32 corresponding in degrees with the amount of rotation of the cam shaft beginning with the point of activation through the selector button. The movement of the plate 54 to the extreme left activated the magnetic head 108 through contact switch 121. Member 31 having reached the edge of contact surface 32 and gone into contact surface 33 which is currently deactive. The deactivation of solenoid 36 disengages clutch 67 from 65 thereby disengaging the drive to the cam shaft.

RECORDING OR REPRODUCING SEQUENCE

The recording or reproducing is now taking place on the tape drawn from container 21.

At the end of the recording or reproducing sequence, after the tape has been driven past the magnetic head for a determined length of time, a contact 122 mounted near the magnetic head, which has been engaged with the tape as it traveled past, will be energized through its contact with micropaint placed on the tape at the end of the recording or reproducing. The energizing of this switch 122 activates the solenoid 36 through resistor 123 and arcuate contact member 33 where contact arm 33 now rests at the upper edge. The movement of the solenoid 36 inwardly under a low amperage causes the solenoid plunger 88 to run against switch 124 which bypasses resistor 123 and allows the solenoid plunger 88 to continue its full stroke with full amperage thereafter. This use of the bypass switch in resistor 123 obviates the need for a relay to activate the solenoid plunger through its full amperage when operating with micropaint, as a thin application of conventional micropaint or silver paint will not dependably carry the current of that magnitude. This switch 124 is positioned only a short way away from the position of the solenoid plunger 36 so that solenoid plunger 88 moves freely under only its own weight by virtue of slots 125 until it reaches position shown in FIG. 6, when at that point it closes switch 132. Immediately after closing switch 124, which took up only a fraction of the solenoid plunger's full stroke, the plunger now engages pin 126, which pin is fixedly mounted to bar 86 and said bar moves against cap 89 and engages clutch 67 with 65. The use of the bypass switch system, just described, is a preferred form of the invention; however, an intermediate step-up relay could be used which is the conventional practice.

A safety contact 127 is mounted so as to close at all times except when the plate 54 is in its extreme left position or, in other words, except when plate 54 in in the recording or reproducing position. Switch 127 assures that the solenoid at the sequence remains activated for this particular sequence once begun.

The ensuing movement of the cam shaft will result in placing the mechanism of the machine in the high speed rewinding sequence.

The engaging of clutch 67 with clutch 65 causes the cam shaft to resume movement. The cam surface 68 of cam 66 now guides plate 54 downwardly in its reverse or clockwise direction. Plate 54 moves downwardly and clockwise when viewed from FIG. 4 until cam 70 of plate 54 has disengaged from shaft 71 thus disengaging felt clutch surfaces 81 and 80 and deactivating the drive to the take-up reel.

Since the winding of the tape onto the hub acts to grasp the hub cylindrical surface tightly, hub surface 73 is of a slightly larger diameter than 75 so that the tape does not actually contact hub surface 75. Consequently, the winding of the tape will not prevent shaft 71 from moving out forwardly or outwardly and carrying hub surface 75 with it, and disengaging felt clutch surfaces 81 and 80 from each other. An optional method of overcoming the objection of the winding of the tape grasping the hub area tightly is to key hub surface 75 in a sliding relation to its position on shaft 71 and insert a second spring.

While cam 66 was lowering plate 54, cam 119 was also moving plate 107 upwardly from its neutral or middle position to its upper extreme position shown in FIG. 4. The movement of plate 107 to its upward position causes the engagement of friction drive 105 with the edge of the flange of the supply reel 24 thereby initiating the high speed rewind of the tape back into the container, plate 107 arriving at its upper position shortly after plate 54 has moved sufficiently downward to release shaft 71. The releasing of the hub, through shaft 71, allows the tape on the take-up reel to be unwound freely, however, a slight drag is offered by the micro sensing arm of switch 119 which lightly rides against the underside of the tape on the take-up reel.

The transfer arm and claw 4 is not used to return the end of the tape to the container at the end of the rewind. The movement of the two hub surfaces apart for rewinding allows the bead attached to the end of the tape to freely leave the hubs and enables the tape to completely rewind, thereby returning the bead adjacent to the container resting against the slot 111.

The movement of the plate 107 into its upward position and plate 54 downwardly to disengage shaft 71 was terminated when the contact arm 31 moved off of contact position 33 and onto contact 34. The arcuate length, in degrees, of contact portion 33 corresponds to the rotary cam movement from the time of the activation by the micropoint.

The cam 46 having, in an earlier sequence movement, engaged shaft 50, the rewind drive is operating at a high speed, the power being derived from the rotation of pulley belt 117 which in turn rotates pulley 128 which drives shaft 50 and gear 102 at its larger beveled surface; thereby driving friction gear 105 at a high rate of speed. Friction gear 105, being engaged with the edge of the flange of the container reel 24 thereby rotates the container reel causing the rewinding back onto the reel, and the movement of contact arm 31 onto contact 34 deactivates the solenoid 36 deactivates the drive to the cam shaft.

HIGH SPEED REWIND SEQUENCE

The tape continues to rewind at a high speed until nearly all of the tape has been unwound from the take-up hub. At that point, microcontact 129, which, riding lightly, continuously engages the face of the tape on the take-up hub, has moved sufficiently far to energize the solenoid 36 through contacts 34.

This initiates the low speed rewind sequence causing the cam to resume movement, and changing to low speed rewind by moving plate 54 further downwardly until pin 118 engages cam segmental surface 48 thereby moving plate 46 downwardly and disengaging this plate from the end of shaft 50. This changes the rewind drive from engagement of bevel gear surfaces 102 and 103 together to the engagement of surfaces bevel gears 102 and 104 together.

LOW SPEED REWIND SEQUENCE

The drive continues to wind the tape back onto the supply reel at a low rate of speed. As the last of the tape is unwound from the hub and the bead leaves the hub to be drawn back against the opening in the container, the microswitch 130 which rides in the same mounting as switch 129 but insulated therefrom thereupon reaches the bare hub surface energizing solenoid 36, the rewind at this point having reached completion. The use of the long nylon thread which will be affixed to more than the last convolution of tape and which now will have been wrapped around will prevent undue stress on the end of the tape from the bead running against the supply container when the rewind ends. The slot 111 prevents the bead from entering within the container. Also, a felt clutch is inserted at location 131 separating this member into two pieces with 104′ fixed to shaft 106 and 104 rotating free of the shaft 106, the friction member between thereby causing rotation of shaft 106 and thereby enabling the gear 105 to stop when the rewind ends by overcoming the friction of the clutch driving action should switch 130 activate a little late.

The hunting sequence for the next selected container will begin at the end of this sequence of the cam shaft movement caused by this activation of the solenoid 36 through switch 130. This causes the cam to resume movement until drive 98 has engaged the inner surface 99 of the turret or container ring 20 and this drive begins the rotation of the turret. The movement of plate 97 upwardly thereby moves the drive 98 into engeagement thereby releasing the alignment portion of the plate which may be used and which would have been resting in grooves on the underside of the turret up until this time, in the opposite direction this time, releasing the alignment.

The movement of the pivoted end 132 of plate 72 toward the end 26 of the selector button 21 resulted in the end 132 engaging the flange 134 of plate 133, moving plate 133 to engage the end portion 26 of the button rejecting the same downwardly and thus restoring button 21 to its undepressed position. Plate 72 moves on sufficiently far enough to cause the one-way catch 132 to ride over flange 134 of plate 133, this thereby allowed plate 133 to spring back to its position shown in dashed lines. When plate 97 later returns at the end of the hunting sequence, its one-way pivot catch 132 will pass freely over the plate 133, this catch only operating when engaged from one direction. Once having returned over the catch, it will then be able to engage and move the plate 133 the next appropriate time.

Upon the engagement of drive 98 with the inner surface 99, the rotating contact arm 31 moved off of the arcuate contact portion 35 and thus deactivated solenoid 36 removing the drive to the cam shaft.

The turret automatically begins rotation again in the sequence for the next selected tape container in counterclockwise succession.

The cam shaft has now made one complete rotation since the beginning of the described operation, having passed through four sequences, namely, the hunting sequence, the playing of the selected tape into operative position, the high speed rewind, and the low speed rewind, and has now returned to the hunting sequence. The length of the four arcuate contact members varies corresponding to the next and the related engagement and disengagement of the clutches 73 and 75.

The turret continues to rotate until depressed selected button 21′ closes switch 28 by pressing against pivot plate 28′, activating solenoid 36 again. The recording or reproducing automatically takes place upon the second selected container 23′ and thereafter the tape automatically returns into the container and the selector button 21′ is restored to its undepressed position. This operation upon the second selected container is identical with sequential operation just described in connection with container 21.

The turret then resumes rotation and automatically repeats the same operation upon the third selected recording container 23″.

After the operation has been completed upon all three selected containers, the turret continuous rotating until another selection is made or main switch 114 is opened, however, an automatic turn-off may be provided if desired.

In order to cancel any recording or reproduction while it is in progress, the operator merely closes switch 135 which terminates the recording or reproducing sequence, and the mechanism automatically moves onward to rewind sequence.

While this previously described operation consisted of recording or reproducing a single selection in a single direction in each container by driving the tape past the magnetic head, it is readily contemplated that the recording upon an individual container or reel of tape can be varied as to order, direction, sequence and number of tracks.

One such variation or modification intended to be within the scope of this invention is the recording or reproducing in alternate directions in immediate succession either monaurally, or binaurally.

It will be obvious to those skilled in the art that various other changes may be made in the invention without departing from the spirit and scope thereof and therefore the invention is not limited by that which is illustrated in the drawings and described in the specification but only as indicated in the appended claims.

What is claimed is:

1. In a recording or reproducing apparatus, a rotary annular cover means, a plurality of individual recording or reproducing mediums, said cover means having a plurality of slots disposed at intervals about its circumference for receiving said plurality of individual recordable or reproducible mediums therein, means for rotating said cover means, and selection means on said cover means for selecting certain of the individual mediums, means automatically revolving the cover means and automatically recording or reproducing upon said certain of said individual mediums, and means restoring the selection means to their unselected position.

2. A selection recording or reproducing apparatus comprising annular cover means, said cover means having a plurality of radial slots about its circumference, a plurality of units of recordable or reproducible material mounted in said slots, means for rotating said cover means, said units having upper portions projecting outwardly from said cover means whereby said upper portions may be exposed to view, means to rotate said cover means to facilitate the exchange and removal of said units, and means for selecting and automatically recording or reproducing upon the selected units.

3. A reproducing apparatus comprising rotatable horizontally disposed annular cover means, power means for rotating said cover means, said cover means having a plurality of radially elongated slots disposed at intervals about the circumference of said cover means, said cover means including well structure beneath each of the slots and mounted to the interior of said cover means, a plurality of independent reproducing mediums mounted within said slots and adapted to be supported and rotatably carried by said cover means, said mediums each having an upper portion thereof projecting beyond the exterior surface of said cover means and their lower portion projecting inwardly into said well structure, means to select said mediums for reproducing in sequence, and reproducing means beneath said cover means for reproducing each of said reproducing mediums, means cooperatively relating said reproducing means to each of said mediums upon positioning of said mediums in alignment with said reproducing means.

4. A reproducing apparatus comprising a container having a supply reel therein with reproducible tape wound thereon, a single take-up reel; a single rewind drive; one revolution cam means; transfer means; reproducing means; said cam means actuating said transfer means to transfer the tape of said container to said take-up reel; and actuating said take-up reel for taking up said tape for reproducing; said cam means actuating said rewind drive to engage the supply reel of said container to rewind the tape back onto the container; said container having a cutaway opening to provide access to its supply reel along its outer circumferential edge, said rewind drive upon its actuation shifting into engagement with said outer edge of said supply reel via said cutaway opening to rotate said supply reel relative to said container for said rewinding.

5. Reproducing apparatus comprising a plurality of containers each having a supply reel therein with reproducible tape wound on said supply reel, shifting means for said containers for shifting said containers individually into alignment for reproducing; a single take-up reel; transfer means; reproducing means; a single rewind drive; revolving cam means; said cam means actuating said shifting means to shift one of said containers into alignment; said cam means actuating said transfer means to transfer the end of the tape of said one of said containers to said take-up reel and actuating said take-up reel for taking up and reproducing said tape, said cam means actuating said rewind drive to engage said supply reel of said aligned one of said containers to rewind the tape back into the containers; said cam means after reproducing being adapted to repeat its revolution for aligning, transfering, taking up and reproducing and rewinding with respect to the tape of said another one of said containers, each of said containers having a cutaway opening to provide access to its supply reel along its outer circumferential edge, said rewind drive upon its actuation shifting into engagement with said outer edge of said supply reel of said aligned one of containers via said opening to rotate said supply reel relative to said container for said rewinding.

6. A reproducing apparatus comprising a plurality of containers each having a supply reel therein with reproducible tape wound on said supply reel; shifting means for shifting said containers individually into alignment for reproducing; a single take-up reel; reproducing means; a single rewind drive; transfer means for transfering the tape of an aligned one of said containers to said take-up reel; revolving cam means actuating said take-up reel for taking up said tape for reproducing; said cam means actuating said rewind drive to engage said supply reel of said aligned one of containers to rewind the tape back onto the supply reel of said one container; said containers each having a cutaway opening to provide access to its supply reel along its outer circumferential edge, said rewind drive upon actuating shifting into engagement with said outer edge of said supply reel of said aligned one of said containers via said cutaway opening to rotate said supply reel relative to said containers for said rewinding.

7. A reproducing apparatus comprising a plurality of tape containers, each having a supply reel therein with reproducible tape wound on said supply reel, a tape take-up reel, container shifting means for shifting said containers one at a time into alignment with said take-up reel for reproducing, said containers being detachably mounted to said shifting means, transfer means to transfer the end of the tape of an aligned one of said containers to said take-up reel for said take-up reel to take up the tape, reproducing means for reproducing as to the tape of said aligned one container, a single rewinding means for engaging the supply reel of an aligned container for rewinding the tape of said aligned one container, a motor transmitting drive to said take-up reel and rewinding means, a plurality of revolving cams, said revolving cams actuating said take-up reel and rewinding means, a solenoid actuated engaging means engaging said cams in driving relation with said motor for said revolving of said cams to enable a positive sequence of said apparatus for reproducing upon the tape of each of said containers.

8. A reproducing apparatus according to claim 7 wherein said revolving cams also actuate said transfer means.

9. A reproducing apparatus according to claim 8 where said revolving cams also actuate said shifting means.

10. A reproducing apparatus according to the claim 9 wherein said apparatus includes a single constant speed means driven by said motor and engaging means for engaging said tape of said aligned one container to said constant speed means for driving said tape at a constant speed for reproducing, and said cam means also actuates said engaging means.

11. A reproducing apparatus according to the claim 10 wherein said motor transmits drive to said take-up reel via said constant speed means and transmits drive to said revolving cam means via said constant speed means.

12. A reproducing apparatus according to the claim 11 wherein said revolving cam means comprises a plurality of cams fixed along a rotating cam shaft, with said cam shaft, said take up reel, said rewinding means, and said constant speed means each having their rotational axis parallel to one another and extending in the same general direction.

13. A reproducing apparatus according to the claim 12 wherein said rewinding means comprises a rotatable puck, and each of said supply reels comprises a hub which an annular flange projecting radially from said hub and with said tape wound on said hub of said supply reel and each of said containers has a cut-away opening along its outer edge to provide access to the outer edge of the flange of the supply reel of the container, and upon said actuation of said rewinding means said rotatable puck being adapted to shift into driving engagement with the outer edge of the flange of the supply reel of the aligned one container via flange of the supply reel of the aligned one container via said cutaway opening to rotate the supply reel relative to the container to rewind the tape.

14. A reproducing apparatus comprising a plurality of tape containers each containing a supply reel with reproducible tape wound on said supply reel; transfer means, a singel tape take-up reel means, reproducing means, and a single rewinding means, to transfer the end of the tape of an aligned one of said containers to said take-up reel means, to take up the tape, to reproduce the tape, and to engage the supply reel of the aligned container to rewind the tape, respectively; and shifting means to shift said containers one at a time into said alignment with said take-up reel means and rewinding means; a single motor powering and actuation means actuating said shifting means, said transfer means, said take-up reel means, and said rewinding means.

15. A reproducing apparatus according to claim 14 wherein said shifting means comprises a movable housing, said containers being mounted in said housing one after another along an elongated path, said containers being removable from said housing laterally of the length of said path, said housing being movable relative to said take up and rewind means to shift said containers one after another into said alignment.

16. A reproducing apparatus according to claim 14 wherein said actuation means comprises cam means.

17. A reproducing apparatus comprising a plurality of tape containers each containing a supply reel with reproducible tape wound on said supply reel; transfer means, a single tape take-up reel means, reproducing means, and a single rewinding means, to transfer the end of the tape of an aligned one of said containers to said take-up reel means, to take up the tape, to reproduce the tape, and to engage the supply reel of the aligned container to rewind the tape, respectively; and shifting means to shift said containers into alignment with said take-up reel means and rewinding means, said containers being positioned on said shifting means with the containers adjacent one another and with the rotational axis of the supply reel of each container directed toward the supply reel of the adjacent container, said containers each being detachable from said shifting means in a direction laterally of the rotational axis of the supply reel of the container, a motor powering said take-up reel means and rewinding means and actuation means to actuate said transfer, said take-up reel means, and said rewinding means.

18. A reproducing apparatus according to claim 17 wherein said motor also powers said transfer means, and said apparatus includes means to detachably engage said actuation means with said motor for actuating said actuation means.

19. A reproducing apparatus comprising a plurality of tape containers each containing a supply reel with reproducible tape wound on said supply reel; transfer means, a single tape take-up reel means, reproducing means, and a single rewinding means, to transfer the end of the tape of an aligned one of said containers to said take-up reel means, to take up the tape, to reproduce the tape, and to engage the supply reel of the aligned container to rewind the tape, respectively; and shifting means to shift said containers one after another into said alignment with said take-up reel means and rewinding means; a motor powering and revolving cam means actuating said transfer means, said take-up reel means, and said rewinding means.

20. A reproducing apparatus according to claim 19 wherein said shifting means comprises a rotary annular cover means having a plurality of slots disposed radially about the circumference thereof, said containers being detachably mounted in said slots, and said cover means being rotatable for said shifting of said containers into said alignment.

21. A reproducing apparatus according to claim 19 wherein said apparatus comprises detachable engaging means detachably engaging said revolving cam means to said motor actuate cam means.

22. A reproducing apparatus according to claim 21 wherein said containers each have a cutaway opening and said supply reels each have a hub with said tape wound on said hub and an annular flange projecting radially from said hub, and said rewinding means comprising a rotatable drive adapted to engage the outer circumferential edge of the annular flange of the supply reel of the aligned container via said cutaway opening for said rewinding of said tape.

23. A reproducing apparatus comprising a plurality of tape containers each containing a supply reel with reproducible tape wound on said supply reel; transfer means, a single tape take-up reel means, reproducing means, and a single rewinding means, to transfer the end of the tape of an aligned one of said containers to said take-up reel means, to take up the tape, to reproduce the tape, and to engage the supply reel of the aligned container to rewind the tape, respectively; a motor powering and actuation means actuating said transfer means, said take-up reel means, and said rewinding means.

24. A reproducing apparatus according to claim 23, wherein said actuation means comprises revolving cam means.

25. A reproducing apparatus according to claim 24, wherein said apparatus includes constant speed means and said cam means also actuates said constant speed means.

26. A reproducing apparatus according to claim 23 wherein said container has a cutaway opening for said rewinding means to engage said supply reel for said rewinding of said tape.

References Cited

UNITED STATES PATENTS

| | | |
|---|---|---|
| 2,290,071 | 7/1942 | Rinaldy. |
| 2,345,869 | 4/1944 | Edwards. |
| 2,891,736 | 6/1959 | Blaes. |
| 3,001,025 | 9/1961 | Gallbert. |
| 3,081,668 | 3/1963 | Nistri. |

FOREIGN PATENTS

| | | |
|---|---|---|
| 573,338 | 2/1958 | Italy. |

STANLEY M. URYNOWICZ, Jr., Primary Examiner

J. R. GOUDEAU, Assistant Examiner

U.S. Cl. X.R.

179—100.3; 226—92; 242—181, 188; 274—4; 340—174.1; 352—8